Jan. 24, 1933.    W. R. FREEMAN    1,895,316
BRAKE CONTROL MECHANISM
Filed March 27, 1929    2 Sheets-Sheet 1
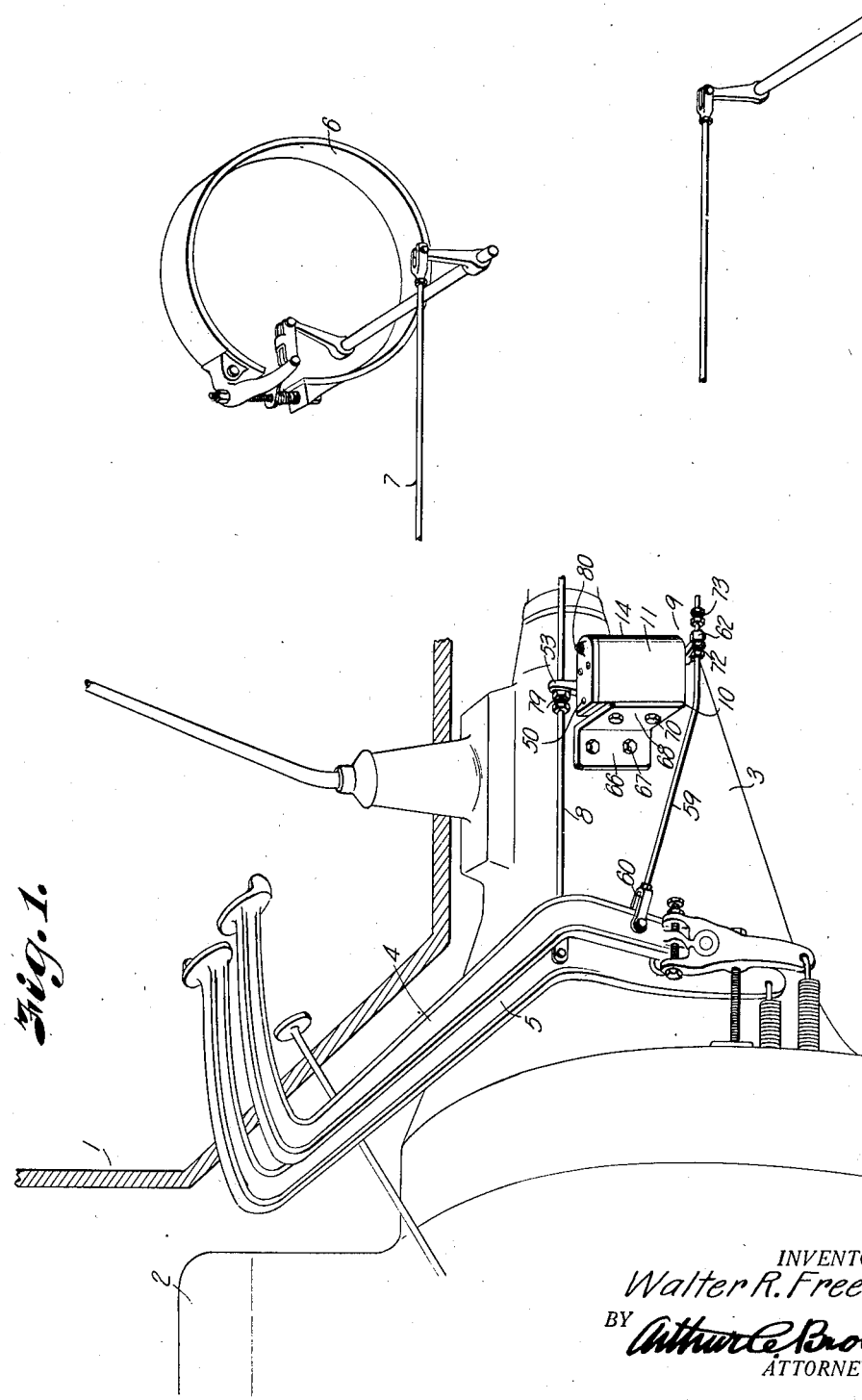
INVENTOR.
Walter R. Freeman
BY Arthur C. Brown
ATTORNEYS.

Jan. 24, 1933.  W. R. FREEMAN  1,895,316
BRAKE CONTROL MECHANISM
Filed March 27, 1929   2 Sheets-Sheet 2
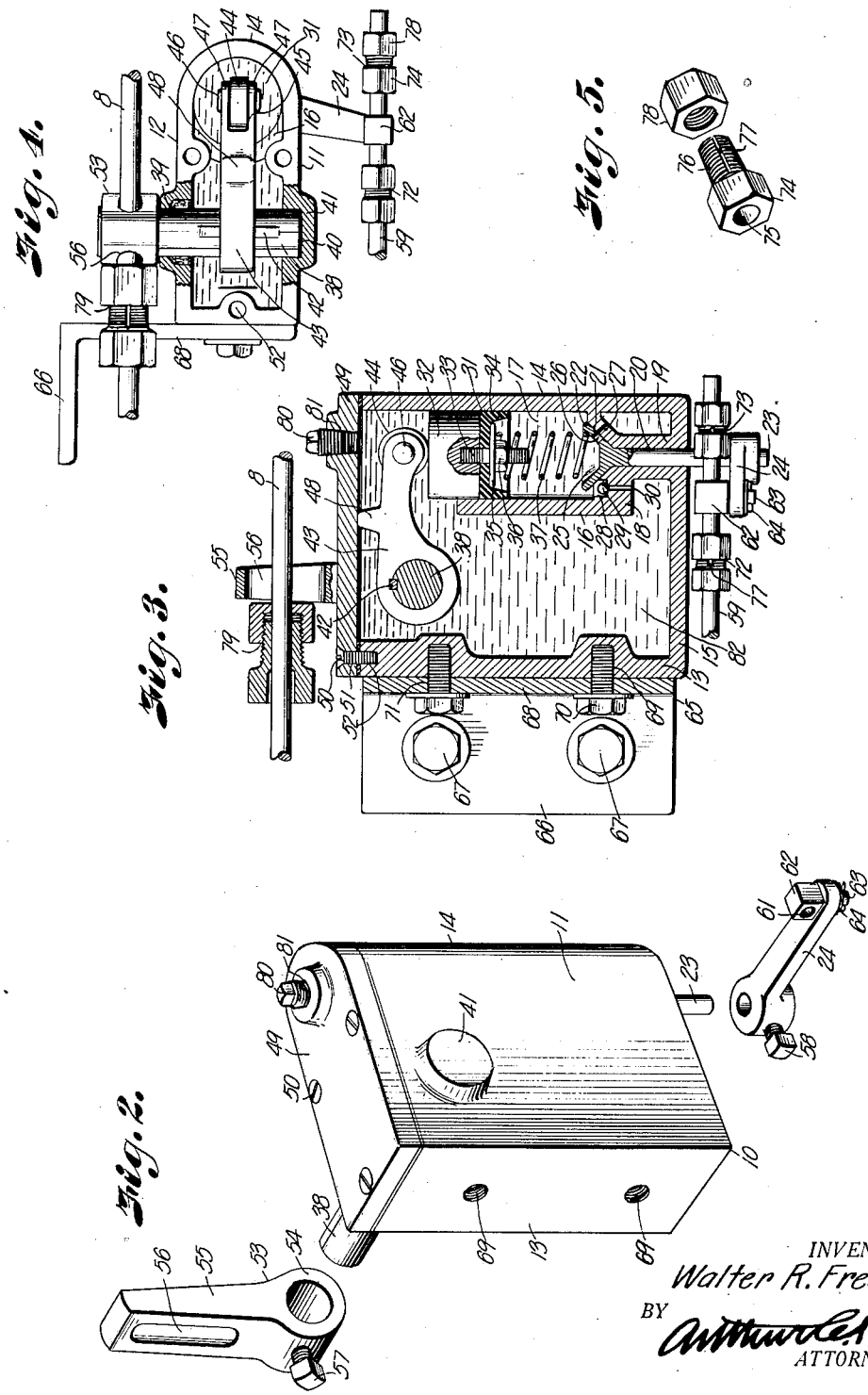
INVENTOR.
Walter R. Freeman
BY Arthur C. Brown
ATTORNEYS.

Patented Jan. 24, 1933

1,895,316

UNITED STATES PATENT OFFICE

WALTER R. FREEMAN, OF TULSA, OKLAHOMA, ASSIGNOR TO MIDWEST ENGINEERING CORPORATION, OF TULSA, OKLAHOMA, A CORPORATION OF OKLAHOMA

BRAKE CONTROL MECHANISM

Application filed March 27, 1929. Serial No. 350,208.

My invention relates to automotive brake systems and more particularly to a brake controlling mechanism whereby release of the brakes may be controlled from the clutch pedal.

Ordinarily when stops are made on hill sides it is very difficult for most drivers to get under headway without losing control of the car before engaging the clutch and during the interval between release of the brakes and the application of the foot accelerator, allowing the car to coast backward or forward, as the case may be, before the throttle can be actuated. It also usually happens that the operator in his haste to actuate the throttle will apply too much pressure to the accelerator causing a jerky start or complete stalling of the motor.

It is therefore the principal object of this invention to provide for positive control and release of the brakes to permit the operator to get his car smoothly under headway without danger of stalling the motor.

In accomplishing this and other objects of the invention, I have provided improved details of structure, the preferred forms of which are illustrated in the accompanying drawings, wherein:

Fig. 1 is a perspective view of a portion of a motor vehicle illustrating the application of the preferred embodiment of my invention.

Fig. 2 is a perspective view of the control apparatus illustrating the valve and piston actuating levers in disassembled relation.

Fig. 3 is a central vertical section through the housing illustrating arrangement of the brake locking piston and the valve for controlling movement of the piston.

Fig. 4 is a plan view of the housing and control levers with the cover removed and parts of the side walls being broken away to illustrate mounting of the piston actuating shaft.

Fig. 5 is a perspective view of one of the stop members disassembled.

Referring in detail to the drawings:

1 designates a motor vehicle including the power unit 2 and transmission 3 between which a clutch (not shown) is operable by a foot pedal 4 for effecting connection or disconnection of the power unit with the wheels of the vehicle, and pivotally mounted adjacent the clutch pedal is the usual brake pedal 5 for actuating the brake bands 6 through the brake rigging 7 connected with the brake pedal by a rod 8 in the usual manner.

9 designates my control apparatus which is associated with the brake and clutch pedals and includes a preferably rectangular cup-shaped housing 10 comprising side walls 11, and 12, end walls 13 and 14 and bottom 15. The end wall 14 is preferably semi-cylindrical and cooperates with a similar shaped partition 16 extending across the housing between the side walls to provide a cylindrical piston chamber 17. The piston chamber is preferably spaced from the bottom of the housing and is closed at its lower end by a horizontal diaphragm wall 18 connected with the bottom of the housing by a tubular neck portion 19, the neck having a concentric bore 20 extending through the housing into the piston chamber.

The diaphragm 18 is preferably provided within the chamber with a conical shaped valve seat 21 concentric with the bore 20 and seated in the valve seat is a complementary shaped valve head 22 having an integral stem 23 rotatably mounted in the bore and which projects from the housing to mount an actuating lever 24 for rotating the valve head as later described. The valve head 22 is provided with a cone shaped recess 25 in its upper face and extending through the head of the valve is a port 26 adapted for communication with a port 27 located in the wall of the valve seat and opening to the interior of the housing.

Located in a recess 28 in the diaphragm and in juxtaposition with the periphery of the valve head is a ball valve 29 for seating over a port 30 communicating with the interior of the housing, and through which liquid is discharged into the piston chamber as later described. The recess 28 is preferably so located that the ball valve is positioned slightly under the valve head providing a stop for retaining the ball when it is lifted off its seat by the liquid being drawn into the piston chamber.

Slidably mounted in the piston chamber is a piston 31 comprising a cylindrical member 32 having a depending stem 33 and a leather or like cup 34 retained against the bottom end of the member 32 by a washer 35 which is received on the stem and retained against the cup leather by a nut 36 threaded on the stem.

The piston thus described is normally retained at the upper end of the piston chamber by a coil spring 37 having one end engaging against the washer 35 and the other end seated in the recess 25 formed in the valve head so that the spring not only retains the piston in its normal upper position but also exerts pressure on the valve head to prevent leakage past the valve seat, and eliminates the necessity of providing packing around the valve stem.

Rotatably mounted in the upper portion of the housing at the end opposite the piston chamber is a shaft 38 having one end projecting through a bearing opening 39 in the side wall, and its other end received in a bearing recess 40 formed in a boss 41 projecting from the outer face of the opposite side wall. Fixed to the shaft between the side walls by a spline 42 is a piston-actuating lever 43, which projects over the piston chamber and carries a roller 44 for engaging against the upper end of the piston. The roller is positioned in a slot 45 formed in the end of the lever and is rotatably mounted on a pin 46 extending through the bifurcated ends 47 of the lever as best shown in Fig. 4.

The upward movement of the lever is limited by a lug 48 projecting from its upper side and engaging against the cover plate 49 of the housing. The cover plate preferably rests on the upper edges of the housing and is secured thereto by screws 50 which extend through openings 51 in the cover and into threaded openings 52 in the housing.

Fixed on the outer end of the shaft 38 is a lever arm 53 comprising a collar 54 and an integrally extending arm 55 having a longitudinal slotted opening 56 to receive the brake rod 8. The lever is preferably adjustably mounted on the shaft by a set screw 57 extending through a threaded opening in the collar and bearing against the shaft so that the set screw may be loosened and the arm positioned radially for receiving the brake rod.

The lever 24 is similarly mounted on the valve stem by a set screw 58 so that the lever may be positioned properly to register the ports 26 and 27 when the valve is rotated by engagement of the clutch, through an actuating rod 59 having one end pivotally connected to the clutch pedal lever by a clevis 60 and the other end extending through an opening 61 formed in a block 62. This block is pivotally mounted on the lever arm by a stud 63 projecting therefrom and extending through an opening formed in the end of the lever, the stud being secured therein by a cotter pin 64 extending through the stud and engaging the under side of the lever.

While the device thus described may be located in any desired position in proximity to the clutch and brake mechanisms I here illustrate it as being mounted on the transmission case by an angle shaped bracket 65 having one leg 66 fixed to the transmission case by cap screws 67 and the other leg 68 projecting laterally of the case to mount the housing 10, the housing being provided with threaded sockets 69 in its end wall 13 for receiving cap screws 70 which are extended through openings 71 in the bracket and are threaded into the sockets 69 of the housing.

Adjustably sleeved on the rod at each side of the block are stop members 72 and 73 each comprising a polygonal member 74 having an opening 75 therethrough to receive the rod 59 and a threaded extension 76 split as at 77 so that when a tapered threaded collar 78 is screwed thereon the split portion of the stop member is contracted by the nut and tightened on the rod for engagement with the block as later described.

The brake rod is also provided with a similar stop member 79 for engagement by the lever 53 so that when the rod is shifted to release the brakes the stop member will engage the lever and move the piston downwardly against tension of the spring 37.

The housing 10 is also provided with a filler plug 80 threaded into a filler opening 81 in the coverplate whereby the housing may be filled with an actuating liquid designated 82 for acting upon the piston as now described.

The operation and installation of a brake apparatus constructed as described, is as follows:

The housing 10 is secured to the transmission housing by the cap screws 67, and the set screw 57 on the lever 53 is loosened to permit positioning of the lever on the actuating shaft 38 in relation to the position of the brake rod 8. The brake rod is detached from the brake pedal 5 and threaded through the slotted opening 56 in the lever 53, whereupon the brake rod is again connected to the brake pedal.

The stop member 79 is then positioned on the rod so that when the brake is disengaged, the stop member retains the actuating lever 43 in its lowermost position for retaining the piston depressed in the piston chamber. The rod 59 is then inserted through the block 62 on the valve actuating lever and its forward end is connected to the clutch pedal by the clevis 60.

The stop members 72 and 73 are then positioned on the actuating rod 59 so that when the clutch is disengaged, the stop member 73 contacts the block on the valve actuating lever 24 so that further movement of the clutch pedal will move the actuating lever to rotate the valve 22 and close off the port 27 in the valve seat. The clutch pedal will then be released, and the stop member 72 will be positioned to engage the actuating lever for returning the valve to its normal position and bringing the valve port 26 into registry with the port 27. The housing 11 is then filled with liquid through the filler opening 81, whereupon the apparatus is ready for operation.

When the brake pedal is moved to apply the brakes, the stop member 79 on the rod 8 will move away from the lever 53 to permit the piston to rise into the upper portion of the piston chamber under influence of the spring 37, which allows oil to be drawn past the ball check 29 to fill the piston chamber.

If the brake is then released without actuating the clutch pedal the oil which was drawn into the piston chamber will be discharged through the port 26 in the valve, and through the port 27 in the valve seat back into the housing, but if the clutch pedal had been actuated to release the clutch as when bringing the vehicle to a stop, the stop member 73 on the rod 59 engages the valve lever for rotating the valve to carry the port 26 out of alignment with the port 27, thereby retaining the oil which was drawn into the piston chamber from flowing out through the valve ports so that the piston is retained by the oil to hold brakes in set position.

When again starting the car, the operator will remove his foot from the brake pedal and actuate the accelerator to start the car and during this interval the brakes are held in set position by the piston 31 which is supported by the fluid trapped in the piston chamber. He will then remove his foot from the clutch pedal to engage the clutch. Return movement of the clutch pedal then moves the rod 59 rearwardly until the stop member 72 engages the valve actuating lever 24 to move the lever and rotate the valve so that the port 26 will again register with the port 27 in the valve seat, and permit the oil in the piston chamber to flow back into the housing.

The tension of the brakes on the rod will then move the lever 53 rearwardly rocking the shaft 38 and causing the lever 43 to depress the piston against the tension of its supporting spring, thereby allowing the brakes to release.

While I have shown the apparatus as associated with the ordinary mechanical brake mechanism, it is readily apparent that the same apparatus may be employed for controlling release of the brake pedal of automobiles equipped with hydraulic brake actuating systems in similar manner.

What I claim and desire to secure by Letters Patent is:

1. In combination with the brake and clutch actuators of a motor vehicle, a brake actuator control mechanism including a rod connected to the brake actuator, stop means adjustably mounted on the rod, a lever operably engageable with said stop means, hydraulic means for retaining the lever in engaging position to retain the brake actuator in functional position, and means actuated by the clutch actuator to release the hydraulic retaining means.

2. In combination with the brake and clutch actuators of a motor vehicle, a brake control mechanism comprising a housing having a piston chamber therein provided with an inlet port and an outlet port, valves for the ports, a piston in the chamber, means independent of the brake actuator for moving the piston in response to movement of the brake actuator to draw fluid through the inlet port for preventing return movement of the piston to retain the brake actuator in set position, and means actuated by the clutch actuator for opening the outlet valve to permit return of the piston and release of the brake actuator.

3. In combination with the brake and clutch actuators of a motor vehicle, a brake control mechanism comprising a housing having a piston chamber therein provided with an inlet port and an outlet port, valves for the ports, a piston in the chamber, a spring engaging the lower end of the piston, a lever engaging the upper end of the piston and actuated by the piston under influence of the spring when the brake actuator is actuated, means actuated by the clutch actuator to close the outlet valve, and means for opening the outlet valve on return movement of the clutch actuator.

4. In combination with the brake and clutch actuator of a motor vehicle, a brake control mechanism comprising a housing having a piston chamber therein provided with fluid inlet and outlet ports, a valve closing the outlet port, a check valve closing the inlet port, a piston in the chamber, a spring bearing against the piston and the outlet valve, a lever operably engaged with the piston, means connected with the lever for engaging the brake actuator, and means connecting the clutch actuator with the outlet valve for controlling fluid discharge from the piston chamber.

5. In combination with the brake and clutch actuators of a motor vehicle, a brake control mechanism comprising a housing having a piston chamber provided with liquid inlet and outlet ports, a valve closing the outlet port, a check valve for the inlet port limited in its movement from said inlet port by the outlet valve, a fluid controlled piston in the piston chamber for retaining the brake mechanism in set position, and means for actuating the outlet valve for controlling discharge of fluid from the piston chamber.

6. In combination with the brake and clutch actuators of a motor vehicle, a brake control mechanism comprising a housing having a piston chamber provided with liquid inlet and outlet ports, a rotary valve in the housing having a port adapted for registering with the outlet port, a check valve for the inlet port, a piston slidable in the piston chamber to draw liquid from the housing into the piston chamber to retain the brake mechanism in set position, and means for rotating the outlet valve to bring said outlet ports into registry and allow the fluid to discharge from the piston chamber to release the brake mechanism.

7. A control mechanism comprising a housing providing a piston chamber, a tapered valve seat in the lower end of the piston chamber provided with a fluid outlet port, a tapered valve for the seat having a port therein adapted for registering with the outlet port upon rotation of the valve in its seat, a locking lever, a piston in the chamber, a spring bearing against the piston and the valve to retain the valve in its seat and the piston normally in engagement with the locking lever, and means for rotating the valve to register the ports for allowing fluid discharge from the piston chamber to release the locking lever.

8. A control mechanism comprising a housing providing a piston chamber, a valve seat in the lower end of the piston chamber provided with a fluid outlet port, a valve for the seat having a port therein adapted for registering with the outlet port upon rotation of the valve in its seat, a locking lever, a piston in the chamber, a spring bearing against the piston and the valve to retain the valve in its seat and the piston normally in engagement with the locking lever, and means for rotating the valve to register the ports for allowing fluid discharge from the piston chamber to release the locking lever.

9. In combination with the brake actuator and clutch mechanism of a motor vehicle, a brake control mechanism comprising a housing including a reserve liquid supply chamber, a piston chamber provided with liquid inlet and outlet ports communicating with the reserve supply chamber, a valve closing the outlet port, a check valve for the inlet port, a fluid controlled piston in the piston chamber for retaining the brake mechanism in set position, means operably connected with the brake mechanism and responsive to outward movement of the piston from the piston chamber, said means including a lever and a roller rotatably mounted in the lever and engageable with said piston, and means for actuating the outlet valve for controlling discharge of fluid from the piston chamber.

10. In combination with the brake and clutch actuators of a motor vehicle, a brake control mechanism comprising a housing having a piston chamber therein provided with an inlet and an outlet port, valves for the ports, a piston in the chamber, a brake rod connected to the brake actuator, a stop member adjustably mounted on the rod, means engaging the piston and said stop member to retain the brakes in set position in response to outward movement of the piston from the chamber, means actuated by the clutch actuator to close the outlet valve to prevent inward movement of the piston, and means for opening the outlet valve on return movement of the clutch actuator.

11. In combination with the brake and clutch actuators of a motor vehicle, a brake control mechanism comprising a housing having a piston chamber therein provided with an inlet and an outlet port, valves for the ports, a piston in the chamber actuated in response to movement of the brake actuator to draw fluid through the inlet port for preventing return movement of the piston to retain the brake actuator in set position, a rod connected to the clutch actuator, a lever on the outlet valve, means for flexibly connecting said lever to the rod, and stop means adjustably mounted on the rod on each side of said connecting means and adapted to engage said means for respectively opening and closing the outlet valve.

In testimony whereof I affix my signature.

WALTER R. FREEMAN.